United States Patent
Dhake et al.

(10) Patent No.: US 10,596,876 B2
(45) Date of Patent: Mar. 24, 2020

(54) METHOD FOR ADJUSTING FINE PARTICULATE MEASUREMENT VALUES

(71) Applicant: FORD GLOBAL TECHNOLOGIES, LLC, Dearborn, MI (US)

(72) Inventors: Abhinav Dhake, Aachen (DE); Volker Scheer, Roetgen (DE); Upendra Patel, Canton, MI (US); Clay W. Maranville, Ypsilanti, MI (US); Lawrence C. Karas, New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/295,286

(22) Filed: Mar. 7, 2019

(65) Prior Publication Data
US 2019/0283525 A1    Sep. 19, 2019

(30) Foreign Application Priority Data
Mar. 14, 2018 (DE) .......................... 10 2018 203 858

(51) Int. Cl.
*B60H 1/00* (2006.01)
*G06K 9/00* (2006.01)

(52) U.S. Cl.
CPC ......... *B60H 1/008* (2013.01); *B60H 1/00742* (2013.01); *B60H 1/00771* (2013.01);
(Continued)

(58) Field of Classification Search
CPC ............................. B60H 1/008; B60H 3/0085
See application file for complete search history.

(56) References Cited

U.S. PATENT DOCUMENTS 6,206,775 B1    3/2001    Lemaitre et al.
9,688,194 B2    6/2017    MacNeille et al.
(Continued)

FOREIGN PATENT DOCUMENTS

KR    20140027647 A    3/2014

OTHER PUBLICATIONS

Wayne Ott, et al., Air Change Rates of Motor Vehicles and In-Vehicle Pollutant Concentrations From Secondhand Smoke, Journal of Exposure Science and Environmental Epidemiology (2008) 18, 312-325.
(Continued)

*Primary Examiner* — Fabricio R Murillo Garcia
(74) *Attorney, Agent, or Firm* — Frank L. Lollo; MacMillan, Sobanski & Todd, LLC

(57) ABSTRACT

A motor vehicle monitoring system displays air quality data comprised of a particulate matter concentration to a vehicle occupant. Fine particulate measurement values are collected from a sensor. At least one state parameter of the motor vehicle is detected, wherein the state parameter is indicative of a temporary disturbance of a concentration of the fine particulates exposed to the sensor. The fine particulate measurement values may be updated according to a correction factor as a function of the detected state parameter. The state parameter may include an air temperature, an air humidity, a current geographic position of the motor vehicle, an opened or closed state of a vehicle door, an opened or closed state of a vehicle window, an operating state of a blower fan of an air conditioning system, and a determination whether smoking is currently taking place in the motor vehicle.

12 Claims, 2 Drawing Sheets

(52) U.S. Cl.
CPC ..... *B60H 1/00985* (2013.01); *G06K 9/00791* (2013.01); *G06K 9/00832* (2013.01)

(56) References Cited

U.S. PATENT DOCUMENTS

| | | | |
|---|---|---|---|
| 2004/0144186 A1* | 7/2004 | Ketley | G08G 1/0175 |
| | | | 73/865.9 |
| 2009/0326760 A1 | 12/2009 | Clark et al. | |
| 2013/0276445 A1* | 10/2013 | Chen | F01N 3/023 |
| | | | 60/605.1 |
| 2015/0120229 A1* | 4/2015 | Sugiyama | G01N 15/0606 |
| | | | 702/85 |
| 2016/0280160 A1* | 9/2016 | MacNeille | G05B 15/02 |
| 2017/0097294 A1* | 4/2017 | Karakaya | G01N 5/02 |
| 2018/0281566 A1* | 10/2018 | Kwon | B60H 3/06 |
| 2019/0023099 A1* | 1/2019 | Li | B60H 1/00978 |
| 2019/0072050 A1* | 3/2019 | Mauro | F01N 9/005 |

OTHER PUBLICATIONS

N. Hudda & S.A. Fruin, Models for Predicting the Ratio of Particulate Pollutant Concentrations Inside Vehicle to Roadways, Published in Final Edited form as: Environ Sci Technol, Oct. 1 2013; 47(19): .doi:10.1021/es401500c.

* cited by examiner

METHOD FOR ADJUSTING FINE PARTICULATE MEASUREMENT VALUES

CROSS REFERENCE TO RELATED APPLICATIONS

This application claims priority to application DE102018203858.9, filed in the German Patent and Trademark Office on Mar. 14, 2018, which is incorporated herein by reference in its entirety.

STATEMENT REGARDING FEDERALLY SPONSORED RESEARCH

Not Applicable.

BACKGROUND OF THE INVENTION

The present invention relates in general to detection and display of the fine particulate concentration within the air, and, more specifically, to a method and a device for adjusting fine particulate measurement values detected by means of a sensor for detecting fine particulates within a motor vehicle.

Motor vehicles can be equipped with a built-in sensor for detecting fine particulates that are present in the air, particularly in order to display the fine particulate concentration within the motor vehicle and/or in the environment outside the motor vehicle in real time. A correct estimate of the fine particulate loading or the fine particulate concentration using sensors to measure them presents certain challenges, in particular in connection with sensors that perform optical detection of the fine particulates. Most sensors are calibrated for a specific range of fine particulate concentrations. Within said range, the sensors react differently, for example depending on whether they are fixed measuring or monitoring stations or depending on a certain calibration device being used that is usually designed for high-precision measurement or for laboratory quality measurements.

Sensors for detecting fine particulates are sensitive to variations in certain environmental conditions, in particular temperature, air humidity, and vibration, as well as to variations of the operating conditions of air conditioning systems, such as for example the use of recirculated air or a fresh air feed or the presence of an open or closed window, etc. Any of these conditions can temporarily disturb the concentration of particulates present at the sensor. Taking into account the different possible combinations of such conditions, there is a challenge in developing a control strategy so that the fine particulate loading can be read out as precisely as possible by means of the sensors.

In addition, it is possible that a vehicle occupant directly contributes to a variation of the fine particulate concentration within the vehicle, for example when the occupant smokes (such as smoking conventional cigarettes or E-cigarettes). In this case, the type, size, and concentration of the aerosols sometimes differ from aerosols that result from sources outside the vehicle. In this case, it is not desirable to inform the vehicle occupant about a fine particulate concentration value caused by their own actions, but up to now there are no reliable methods for distinguishing whether the fine particulate has been produced intentionally or not.

In prior patent document U.S. Pat. No. 9,688,194 B2, a method for analyzing fine particulate measurement values by means of fine particulate sensors in connection with motor vehicles is described.

SUMMARY OF THE INVENTION

Against the described background, it is an object of the present invention to provide a method and a device for adjusting fine particulate measurement values detected by means of a sensor for detecting fine particulates within a motor vehicle. It is a further object of the invention to provide an advantageous motor vehicle. These objects are achieved by a method for adjusting detected fine particulate measurement values as described and claimed below.

Sensors disposed within a motor vehicle for detecting fine particulates are able to measure high-resolution data of the fine particulate concentration. The data must however be correctly interpreted, because variations in the signals are sometimes caused by the operating conditions of the motor vehicle. For example, the windows can be open or closed, there can be sources of different types of fine particulates in the motor vehicle, such as for example particles caused by smoking. Furthermore, the operating conditions of the air conditioning system, in particular a switched-on fan, the use of recirculated air, the opening of doors etc., influence the measured fine particulate values. Moreover, environmental conditions also affect the measurements.

In order to counter this situation, in the context of the present invention a correction factor is used for adjusting the detected fine particulate measurement values under defined conditions. In this case, the signals output by the sensor are adjusted. The adjusted signals can then be forwarded to a human-machine interface, such as an HMI display.

A method according to the invention for adjusting fine particulate measurement values detected (e.g., measured) by means of a sensor for detecting fine particulates, in particular for measuring fine particulates, within a motor vehicle, comprises detecting fine particulate measurement values, for example fine particulate concentration values, by means of a sensor. At least one state parameter of the motor vehicle is detected. The detected fine particulate measurement values are adjusted by means of a correction factor depending on or based on at least one detected state parameter.

Method according to the invention have the advantage that the determined fine particulate measurement values can be adjusted for specific conditions within and/or outside the motor vehicle. This concerns, in particular, conditions that cause a temporary or vehicle occupant-related increase in the detected fine particulate concentration. Moreover, a precise detection of the fine particulate concentration in the air within the passenger compartment is possible, which in particular reflects fine particulate loading that is actually relevant to the user.

In one advantageous embodiment, the rate of change of the detected fine particulate measurement values is determined, for example calculated, and the detected fine particulate measurement values are adjusted if the rate of change exceeds a specified threshold value. As a result, it is possible to apply an adjustment to the fine particulate measurement values only if a sudden or rapid variation of the detected fine particulate measurement values occurs, from which it is assumed that said values do not represent the actual fine particulate loading in the surrounding air or the air within the passenger compartment.

The adjusted fine particulate measurement values can be output to a human-machine interface (HMI), for example by means of an HMI display. This has the advantage that only fine particulate measurement values are output or displayed to a user, in particular a driver or other vehicle occupant, that represent an actually relevant fine particulate loading. The display also enables the user to be informed about the level of the fine particulate loading that is present and to take measures to either reduce the fine particulate loading or to protect himself against the loading.

In a further embodiment, the motor vehicle can comprise an air conditioning system. In this case, at least one parameter of the operating state of the air conditioning system (HVAC parameter) can be detected as a state parameter of the motor vehicle.

In one advantageous embodiment, the temperature, in particular the temperature within or outside the motor vehicle, and/or the air humidity are detected. In addition or alternatively thereto, the current location of the motor vehicle or the position can be detected as a state parameter, for example by means of GPS. Furthermore, the operating state of the vehicle doors, i.e. whether and to what extent the vehicle doors are open or closed, and/or the operating state of the windows, i.e. whether and to what extent said windows are open or closed, can be detected. Advantageously, in addition or alternatively to the features mentioned, the operating state of the blower fans can be detected. Because the features mentioned sometimes influence the measurement result of the fine particulate measurement values detected by means of the sensor, detection of and taking into account the features mentioned is advantageous in respect of adjusting the detected fine particulate measurement values.

Advantageously, as a state parameter it can be detected whether smoking is currently taking place in the motor vehicle. This can be smoking tobacco or other smoking goods and/or vaping, i.e. the smoking of E-cigarettes. Because smoking by vehicle occupants alters or falsifies the detected fine particulate measurement values in respect of the fine particulates actually present in the surrounding air, suitably accounting for the fact of smoking within the motor vehicle is of advantage. The user is typically not primarily interested in a notification of a self-inflicted fine particulate loading but wants the fine particulate loading of the surrounding air to be displayed or notified.

In one advantageous embodiment, the interior of the vehicle and/or the surroundings of the motor vehicle can be at least partly recorded by means of a camera. The recorded data can be analyzed in respect of possible causes of an increased fine particulate loading. The detected fine particulate measurement values can then be adjusted depending on the result of the analysis. The use of a camera in particular provides for the detection of whether smoking is currently taking place in the motor vehicle. By means of the camera, it can in particular be determined whether there are sources of temporarily increased fine particulate concentration in the vehicle surroundings. This can also be a motor vehicle ahead emitting exhaust gases with an increased fine particulate loading, for example.

In one advantageous embodiment, the correction factor is adjusted as a function of the at least one detected state parameter. This can be carried out continuously, at specified times or at specified intervals or at points in time selected by a user. The direct adjustment of the correction factor has the advantage that the detected fine particulate measurement values do not have to first be analyzed in respect of a rate of change, but an adjustment can take place immediately in the presence of a specified state parameter. In this connection, specified or predefined correction factors can be used, for example for certain state parameters. The direct adjustment of the correction factor thus has the advantage that a particularly fast adjustment can be carried out.

The device according to the invention for adjusting fine particulate measurement values detected, in particular measured, within a motor vehicle by means of a sensor for detecting fine particulates, in particular by means of a sensor for measuring fine particulates, is characterized in that that it comprises a sensor for the detection of fine particulate measurement values. Furthermore, the device comprises an arrangement for detecting at least one state parameter of the motor vehicle. The device according to the invention thus comprises a controller that is designed to carry out a method according to the invention that is described above.

The sensor can in particular be designed for detecting the fine particulate concentration. The controller can in particular be designed to determine the rate of change of the detected fine particulate measurement values, in particular to calculate the rate of change. In addition or alternatively, the controller can be designed to adjust the correction factor as a function of the at least one detected state parameter. The device according to the invention has basically the same advantages and features as the previously described method according to the invention.

The motor vehicle according to the invention comprises a sensor for detecting fine particulates within the motor vehicle. The motor vehicle is designed for carrying out a method according to the invention described above. In addition or alternatively thereto, the motor vehicle according to the invention can comprise a previously described device according to the invention. The motor vehicle according to the invention has the same advantages and features as the method according to the invention described above and the already described device according to the invention. The motor vehicle can for example be a passenger vehicle or a truck.

BRIEF DESCRIPTION OF THE DRAWINGS

The invention is described in detail below using exemplary embodiments with reference to the accompanying figures. Although the invention is illustrated and described in detail by the preferred exemplary embodiments, the invention is not restricted by the disclosed examples and other versions can be derived therefrom by the person skilled in the art without departing from the protective scope of the invention.

DETAILED DESCRIPTION OF PREFERRED EMBODIMENTS

Figure 1:
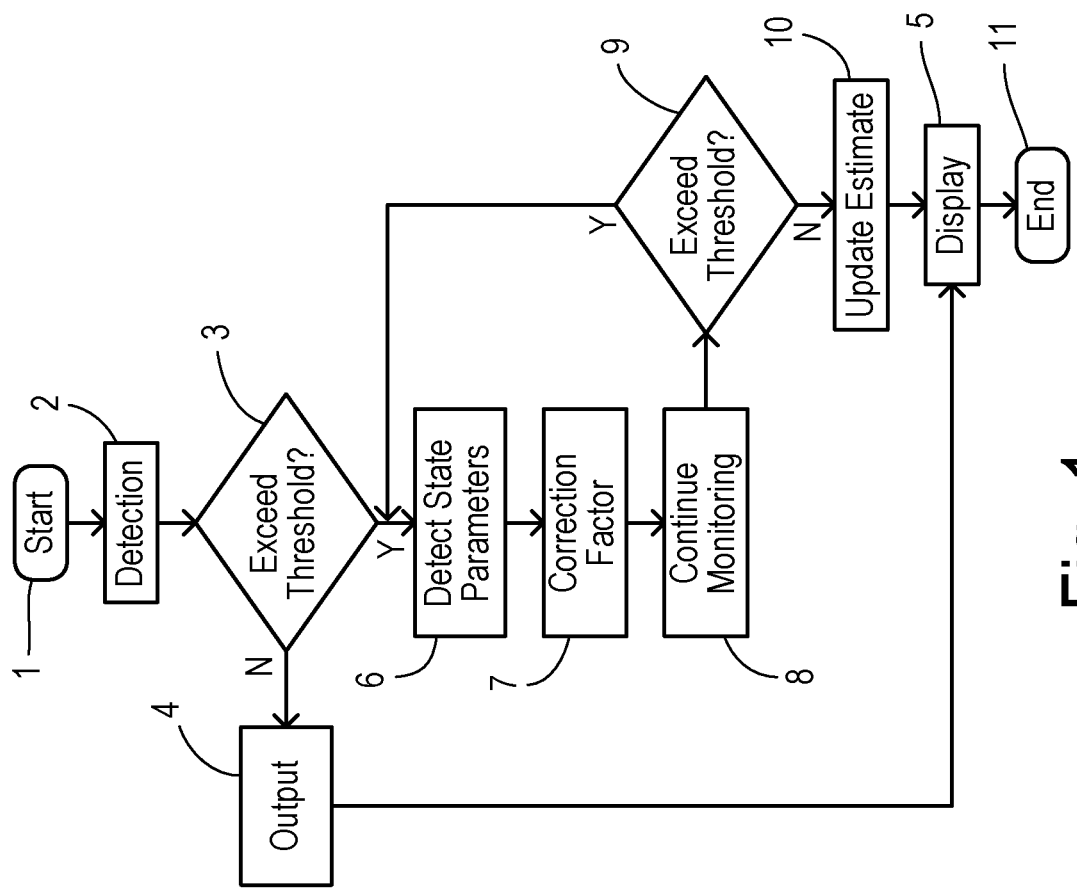
FIG. 1 is a schematic diagram showing a first embodiment version of the method according to the invention in the form a flowchart.

FIG. 1 shows schematically a first embodiment of a method according to the invention in the form of a flowchart. The method starts at step 1. In step 2, fine particulate measurement values are detected by means of a sensor. Particulate matter sensors are commercially available that are suitable for motor vehicle use. The detected measurement values can be output by the sensor. In step 3, it can be investigated whether the rate of change of the detected fine particulate measurement values exceeds a specified threshold value. The rate of change is preferably determined from the fine particulate measurement values that are output, in particular calculated, by the sensor in step 2. If the rate of change does not exceed the specified threshold value, then in step 4 the fine particulate measurement value or the measurement values detected by the sensor is/are output (i.e., transmitted) to a display device. In step 5, the detected measurement values are displayed as fine particulate concentration values by means of a display, in particular a display that is disposed within a motor vehicle.

If the rate of change exceeds the specified threshold value, then in step 6 identification of the measurement values concerned is carried out. Moreover, in step 6 at least one state parameter of the motor vehicle is detected. In this connection, in particular, one or more different parameters such as vehicle system data, GPS data, the operating state of the air conditioning system, and further state parameters of the motor vehicle already mentioned above are detected. In step 7, at least one detected fine particulate measurement value, preferably the fine particulate measurement values identified in step 6, is/are adjusted by means of a correction factor as a function of at least one of the detected state parameters.

Then in step 8 the observation or monitoring of the detected fine particulate measurement values is continued, wherein said values are checked in relation to the rate of change thereof. In step 9, a check is carried out as to whether the rate of change continues to exceed the specified threshold value. If this is the case, then the method is continued in step 6. If this is not the case, then in step 10 an update of the estimate of the fine particulate concentration is carried out. In other words, the values adjusted by means of the correction factor are output to a display device. In step 5, the corrected fine particulate measurement values are then displayed as fine particulate concentration values. The method ends in step 11.

A sensor for detecting fine particulate measurement values is typically calibrated in relation to defined reference devices. Said standard calibration can be restricted insofar as it is not capable of taking into account the dynamics of the detected particles or the type of particles. In the context of the present invention, this situation is taken into account. In this case, two types of control can be distinguished. The first consists of the active adjustment of the data obtained by means of the sensor. The second version consists of the passive adjustment of the obtained measurement data.

In the context of the first version, fine particulate measurement values are detected by means of a sensor. Furthermore, data of further vehicle systems, in particular vehicle state parameters, are detected. In this case they are the state of the windows, i.e. open or closed, of the doors, i.e. open or closed, the operating state of the air conditioning system, in particular the use of recirculated air and/or fan etc., the ambient temperature, the temperature in the vehicle interior, the air humidity, and so on. If for example the position of the windows, i.e. open or closed, is taken into account, then said condition can be used by way of example to estimate whether a defined variation of the detected fine particulate measurement values is caused thereby. If for example a rate of change of the detected fine particulate measurement values lying above a threshold value is to be observed, the position of the windows can be identified as a possible cause thereof and the measurement value can be adjusted accordingly. This can in particular be carried out using a correction factor. This enables a correction of the estimated fine particulate measurement value to be carried out in real time. The corrected value can then be displayed to a user.

A position of the vehicle determined by means of GPS can also be used as a vehicle state parameter in addition to the mentioned operating conditions. A higher fine particulate loading can occur for example because of driving through a tunnel, overtaking a truck, passing a construction site, etc. In order to be able to assess the cause of the poor air quality, at least one photograph can also be recorded by means of a camera and assessed in relation to possible causes of an increased fine particulate loading. This enables a further fine adjustment or adjustment of the output signal in relation to the actual fine particulate concentration. In this case, the device according to the invention and the method according to the invention have the advantage that sensors typically already present in a vehicle or even data already detected in another connection can be used.

A second version concerns the passive adjustment of the detected fine particulate measurement values. In this version, the correction factor is applied directly based on inputs of detected vehicle state parameters, for example the operating state of the air conditioning system, the position of the windows and/or the doors, etc. without having to wait for a further analysis of the concentration values detected by the fine particulate sensor. In this case for example, correction factors can be stored for different situations and operating states of the motor vehicle. The respective factor can then be used immediately for adjusting the detected fine particulate measurement values. The value for an estimated fine particulate concentration corrected in this way can then be displayed to a user.

Figure 2:
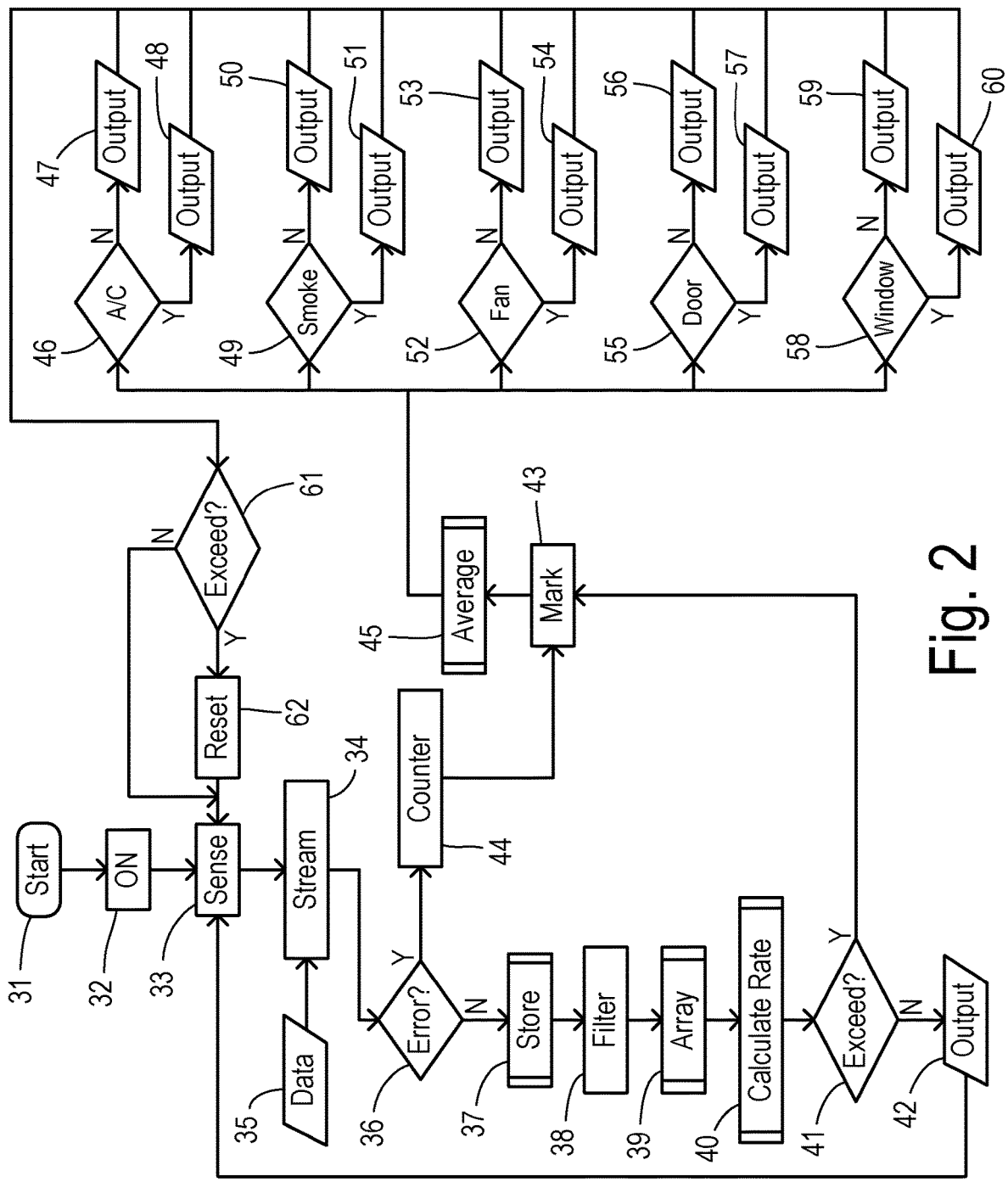
FIG. 2 shows schematically a further embodiment of a method according to the invention in the form of a flowchart.

FIG. 2 shows schematically a further version of a method according to the invention in the form of a flowchart. The method starts at step 31. In step 32, the fine particulate sensor is started operating. In step 33, the detection of measurement values is carried out by the fine particulate sensor. In step 34, fine particulate sensor output signals are produced. For this purpose, measurement data 35 of the fine particulate sensor are input and a raw data stream P_raw(t) is output as a function of time, for example, one signal per second, in micrograms per cubic meter ($\mu g/m^3$).

The data stream is investigated in step 36 for possible errors. If there are no errors, then in step 37 the raw data stream is stored in a memory array. In step 38, a filtered data stream P_filter(t) is produced by averaging the data, for example by means of a suitable filter function, for example $P\_filter(t)=(P_{t-N}+ \ldots +P_{t-2}+P_{t-1}+P_t)/N$. The data stream produced in this way is stored in a memory array in step 39. In step 40, the rate of change, i.e. the change in the concentration against time, $\Delta P\_filter(t)=P\_filter(t)-P\_filter(t-1)$, is calculated. In step 41, a check is carried out as to whether the calculated rate of change exceeds a threshold value. If this is not the case, then in step 42 the calculated fine particulate concentration P_filter(t) is output, e.g., displayed. Then the method is continued in step 33.

If in step 41 the rate of change exceeds a specified threshold value, then in step 43 the value concerned is marked with a counter (Counter=Counter+1) and may be latched. The value is stored. If the presence of an error has been detected in step 36, then in step 44 first an error display for calculating counters (CounterCalN) is caused and the method is then continued in step 43. In step 45, the previously averaged concentration value is latched, $P\_latch=P\_filter(t-1)$.

The steps 46, 49, 52, 55 and 58 are carried out individually or in any combination below. Said steps can be carried out at the same time or in any order. In step 46, a check is carried out as to whether the air conditioning system has changed from recirculated air to a fresh air feed. In addition, a check is carried out as to whether the counter is less than a first counter calculated in step 44

(Counter<CounterCal1?). If there is no change of the air conditioning system from recirculated air to fresh air, then in step 47 a displayed value P_display is output that is equal to the latched value P_latch (P_display=P_latch). If there is a change of the operation of the air conditioning system from recirculated air to fresh air, then in step 48 a first error value P_Error1 is output (P_display=P_Error1).

In step 49, a check is carried out as to whether a vehicle occupant is smoking in the vehicle. In addition, a check is carried out as to whether the counter is less than a second counter calculated in step 44 (Counter<CounterCal2?). If no vehicle occupant is smoking, then in step 50 a value P_display to be displayed is output that equals the latched value P_latch (P_display=P_latch). If in step 49 it is determined that a vehicle occupant is smoking, then in step 51 a second error value P_Error2 is output (P_display=P_Error2).

In step 52, a check is carried out as to whether the revolution rate of the fan has increased. In addition, a check is carried out as to whether the counter is less than a third counter calculated in step 44 (Counter<CounterCal3?). If the revolution rate of the fan has not increased, then in step 53 a value P_display to be displayed is output that is equal to the latched value P_latch (P_display=P_latch). If the revolution rate of the fan has increased, then in step 54 a third error value P_Error3 is output (P_display=P_Error3).

In step 55 a check is carried out as to whether a door is ajar. In addition, a check is carried out as to whether the counter is less than a fourth counter calculated in step 44 (Counter<CounterCal4?). If no door is ajar, then in step 56 a value P_display to be displayed is output that is equal to the latched value P_latch (P_display=P_latch). If in step 55 it is determined that a door is ajar, then in step 57 a fourth error value P_Error4 is output (P_display=P_Error4).

In step 58 a check is carried out as to whether a window is open. In addition, a check is carried out as to whether the counter is less than a fifth counter calculated in step 44 (Counter<CounterCal5?). If no window is open, then in step 59 a value P_display to be displayed is output that is equal to the latched value P_latch (P_display=P_latch). If in step 58 it has been determined that a window is open, then in step 60 a fifth error value P_Error5 is output (P_display=P_Error5).

In step 61, a check is carried out as to whether one of the values P-display to be output is equal to an error value P_errorN or the counter exceeds a maximum counter value. If this is the case, then in step 62 the counter is set to 0 and the method is then continued in step 33. If the conditions checked in step 61 are not fulfilled, then the method is directly continued in step 33.

Figure 3:
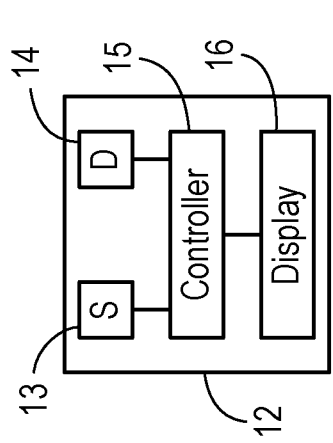
FIG. 3 shows schematically a device according to the invention for adjusting fine particulate measurement values detected by means of a sensor for detecting fine particulates within a motor vehicle.

FIG. 3 shows schematically a device 12 according to the invention for adjusting fine particulate measurement values detected by means of a sensor for detecting fine particulates within a motor vehicle. Device 12 comprises a sensor 13 for detecting fine particulate measurement values, in particular for detecting the fine particulate concentration. The device 12 further comprises a detector arrangement 14 for detecting at least one state parameter of the motor vehicle. Moreover, the device 12 comprises a controller 15 that is designed to carry out a method according to the invention that is described above. The sensor 13 and the detector arrangement 14 are connected to the controller so that a transfer of the measurement values detected by the sensor 13 to the controller 15 and a transfer of the state parameter detected by the arrangement 14 to the controller 15 can be carried out. The device 12 can optionally also comprise a display 16. The display 16 is designed to display the fine particulate measurement values output by the controller 15, which may have been adjusted to according to the method according to the invention.

Figure 4:
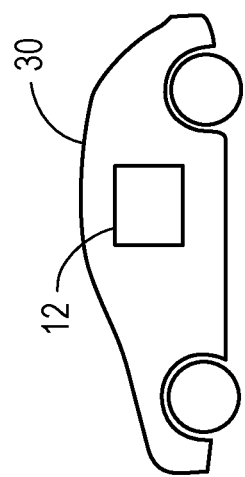
FIG. 4 shows schematically a motor vehicle according to the invention.

FIG. 4 shows schematically a motor vehicle according to the invention. The motor vehicle 30 comprises a device according to the invention 12 for adjusting fine particulate measurement values detected by means of a sensor for detecting fine particulates.

What is claimed is:

1. A method for monitoring particulates in air within a passenger compartment of a motor vehicle using fine particulate measurement values detected by a sensor for detecting fine particulates, the method comprising:
   collecting a plurality of fine particulate measurement values from the sensor;
   detecting at least one state parameter of the motor vehicle from a predetermined plurality of state parameters, wherein each of the predetermined plurality of state parameters is indicative of a respective temporary disturbance of a concentration of the fine particulates being exposed to the sensor, and wherein a corresponding correction factor is defined for each of the predetermined plurality of state parameters;
   updating the plurality of fine particulate measurement values according to the correction factor determined as a function of the detected at least one state parameter to compensate for the respective temporary disturbance; and
   displaying the updated fine particulate measurement values to an occupant of the motor vehicle.

2. The method of claim 1 further comprising the step of:
   determining a rate of change of the fine particulate measurement values;
   wherein updating of the fine particulate measurement values is carried out only if the rate of change exceeds a predetermined threshold value.

3. The method of claim 1 wherein the motor vehicle comprises an air conditioning system, and wherein an operating state of the air conditioning system is detected as the state parameter of the motor vehicle.

4. The method of claim 1 wherein the state parameter is at least one of a group comprising an air temperature, an air humidity, a current geographic position of the motor vehicle, an opened of closed state of a vehicle door, an opened or closed state of a vehicle window, and an operating state of a blower fan of an air conditioning system.

5. The method of claim 1 wherein the state parameter is comprised of whether smoking is currently taking place in the motor vehicle.

6. The method of claim 1 further comprising the steps of:
   capturing images of at least one of an interior of the vehicle and surroundings of the motor vehicle using a camera; and
   analyzing the images to recognize potential causes of an increased fine particulate loading, wherein the updating of the fine particulate measurement values is carried out only if a potential cause is recognized.

7. A monitoring system in a motor vehicle, comprising:
   a sensor for detecting fine particulates in air within a passenger compartment of the motor vehicle;
   a detector for determining at least one state parameter of the motor vehicle from a predetermined plurality of state parameters, wherein each of the predetermined plurality of state parameters is indicative of a respective temporary disturbance of a concentration of the fine particulates being exposed to the sensor;

a controller storing a respective correction factor corresponding to each of the predetermined plurality of state parameters adapted to compensate for the respective temporary disturbance, wherein the controller is programmed to update the fine particulate measurement values according to the correction factor determined as a function of the detected at least one state parameter; and a display for displaying the updated fine particulate measurement values to an occupant of the motor vehicle.

8. The monitoring system of claim 7 wherein the controller further determines a rate of change of the fine particulate measurement values, and wherein the updating of the fine particulate measurement values is carried out only if the rate of change exceeds a predetermined threshold value.

9. The monitoring system of claim 7 wherein the motor vehicle comprises an air conditioning system, and wherein the controller detects an operating state of the air conditioning system as the state parameter of the motor vehicle.

10. The monitoring system of claim 7 wherein the state parameter is at least one of a group comprising an air temperature, an air humidity, a current geographic position of the motor vehicle, an opened of closed state of a vehicle door, an opened or closed state of a vehicle window, and an operating state of a blower fan of an air conditioning system.

11. The monitoring system of claim 7 wherein the state parameter is comprised of whether smoking is currently taking place in the motor vehicle.

12. The monitoring system of claim 7 wherein the sensor comprises a camera capturing images of at least one of an interior of the vehicle and surroundings of the motor vehicle using a camera, wherein the controller analyzes the images to recognize potential causes of an increased fine particulate loading, and wherein the updating of the fine particulate measurement values is carried out only if a potential cause is recognized.

* * * * *